United States Patent [19]

Carpenter

[11] 3,982,978
[45] Sept. 28, 1976

[54] METHOD AND APPARATUS FOR MAKING PILE FABRIC

[75] Inventor: Charles W. Carpenter, Newark, Del.

[73] Assignee: Hercules Incorporated, Wilmington, Del.

[22] Filed: June 24, 1975

[21] Appl. No.: 589,982

[52] U.S. Cl. .............................. 156/72; 156/73.2; 156/73.4; 156/205; 156/210; 156/435; 156/474; 428/85
[51] Int. Cl.² ........................................ B32B 5/00
[58] Field of Search ............... 156/72, 73, 271, 270, 156/435, 474, 167, 205, 210; 428/85, 94; 28/1 F; 264/DIG. 47

[56] References Cited
UNITED STATES PATENTS

| 2,639,250 | 5/1953 | Reinhardt | 428/94 |
| 3,494,522 | 2/1970 | Kim et al. | 225/97 |
| 3,495,752 | 2/1970 | Kim et al. | 225/3 |
| 3,520,762 | 7/1970 | Sakamoto et al. | 28/1 F |
| 3,549,467 | 12/1970 | Keuchel et al. | 156/72 |
| 3,589,964 | 6/1971 | Wandel | 156/271 |
| 3,640,786 | 2/1972 | Carpenter | 156/72 |
| 3,736,209 | 5/1973 | Carpenter | 156/435 |
| 3,900,354 | 8/1975 | Carpenter | 156/73.2 |
| R27,727 | 8/1973 | Kim et al. | 225/3 |

Primary Examiner—William A. Powell
Assistant Examiner—Michael W. Ball
Attorney, Agent, or Firm—Stanley A. Becker

[57] ABSTRACT

This invention relates to a method and apparatus for making pile fabrics wherein a sheet of longitudinally striated thermoplastic film formed into loops is fusion bonded to a thermoplastic backing sheet by sonic energy to bond the film to the backing sheet at the lines of contact without loss of orientation in either the striated film or the backing sheet and then subsequently the bonded striated film is fibrillated to separate the loops into individual filaments thereby forming a pile fabric.

8 Claims, 4 Drawing Figures

METHOD AND APPARATUS FOR MAKING PILE FABRIC

BACKGROUND OF THE INVENTION

This invention relates to a method and apparatus for making pile fabrics and more particularly to a method and apparatus for making fusion bonded pile fabrics without the necessity of handling individual filaments.

Pile fabrics, such as carpeting, are conventionally made by either weaving, wherein a pile yarn is woven into a backing member, or by tufting, wherein the pile yarn is needle-tufted through a backing member at spaced points to form upstanding loops or tufts projecting from the face of the backing. In both weaving and tufting, a portion of the pile yarn between the successive loops or tufts is consumed in the backing. Furthermore, tufted fabrics also require an adhesive coating over the under side of the backing to prevent the pile from being pulled out, which represents an additional expense in the manufacture of the fabric.

Sonic fusion bonding techniques such as I have disclosed in my U.S. Pat. Nos. 3,640,786 and 3,736,209 overcome the deficiencies of the weaving and tufting methods. These patents disclose the sonic fusion bonding of individual pile yarns which are formed into loops to a backing member to make a pile fabric. However, the handling of yarn requires additional time and equipment in manufacture and creates problems that result from one or more individual yarns breaking in production. Moreover, yarn is generally more expensive than film. Additionally, creels and other equipment for holding and handling individual yarns are both costly and space-consuming, as well as requiring considerable time and manpower in replacing empty spools of yarn.

The present invention is directed to a method and apparatus for overcoming the foregoing problems and expediting the manufacture of pile fabrics.

SUMMARY OF THE INVENTION

The subject method and apparatus includes providing a supply roll of longitudinally ribbed or striated thermoplastic film which is oriented in the longitudinal direction. The striated film is formed in a series of waves or loops on the surface of a thermoplastic backing sheet. The striated film is sonically fusion bonded to the backing sheet by applying sonic energy at the lines of contact of the wave or loop of striated film and the backing sheet. By virtue of the sonic fusion bonding, only the materials at the bond line undergo any significant rise in temperature, thereby avoiding any loss in the original levels of orientation in the striated film or the backing sheet if it also is oriented. Following sonic bonding, the loops of striated film are fibrillated, such as by utilizing a fibrillating roll or beater bar as disclosed in U.S. Pat. No. 3,494,522 and Re. 27,727, both of which are incorporated by reference herein, or by using air jet fibrillation means or other well known fibrillation means. The fibrillation step separates the striations into a plurality of tufts of individual oriented pile yarns, each of which is sonically fusion bonded to the backing sheet.

After fibrillating the bonded filaments may, if desired, be sheared to cut the tops of the loops off, thereby making plushtype pile as opposed to a loop pile. Additionally, high or low density pile fabrics can be formed by varying the height of the loops. By utilizing a striated film, there is no need for a creel holding spools of all of the individual filaments or yarn nor any need to replace individual spools as they run out. Furthermore, no individual filament or yarn guides or tubes are needed to properly guide and align each of the individual filaments in its proper relationship with respect to the backing member. Additionally, breakage of individual filaments is no problem since the striated film is completely self-supporting and even though an edge may be torn or individual filaments or ribs may be broken, the sheet moves in its entirety and individual filaments do not have to be rethreaded through the machine in the event of breakage. Moreover, the facilities for forming the loops can be much simpler in view of the fact that the loop is formed from the entire film as opposed to loops being formed from individual filaments. Thus, a simpler, more economical method of and apparatus for making the pile fabric results.

Other advantages of the present invention will be apparent from the following detailed description when considered in conjunction with the following detailed drawings, which drawings form a part of the specification. It is to be noted, however, that the drawings illustrate only a typical embodiment of the invention and are therefore not to be considered limiting of its scope for the invention may admit to other equally effective embodiments.

DESCRIPTION OF THE INVENTION

Figure 1:
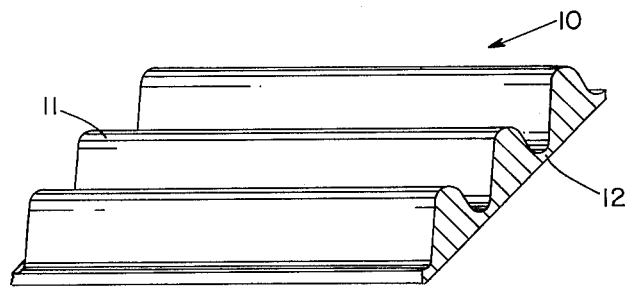
FIG. 1 is a perspective view of a portion of a striated film used in accordance with the principles of this invention.

Referring now to FIG. 1, there is shown a striated film generally designated as 10, having longitudinal ribs or striations 11 interconnected by webs 12 of reduced thickness. The term "striated film" as used herein means any film which is capable of being separated into individual filaments upon fibrillation. This includes, without limitation, films embossed on one or both sides and films which are extruded to have a shape similar to that shown in FIG. 1 with longitudinal ribs being interconnected by webs of reduced thickness.

Figure 2:
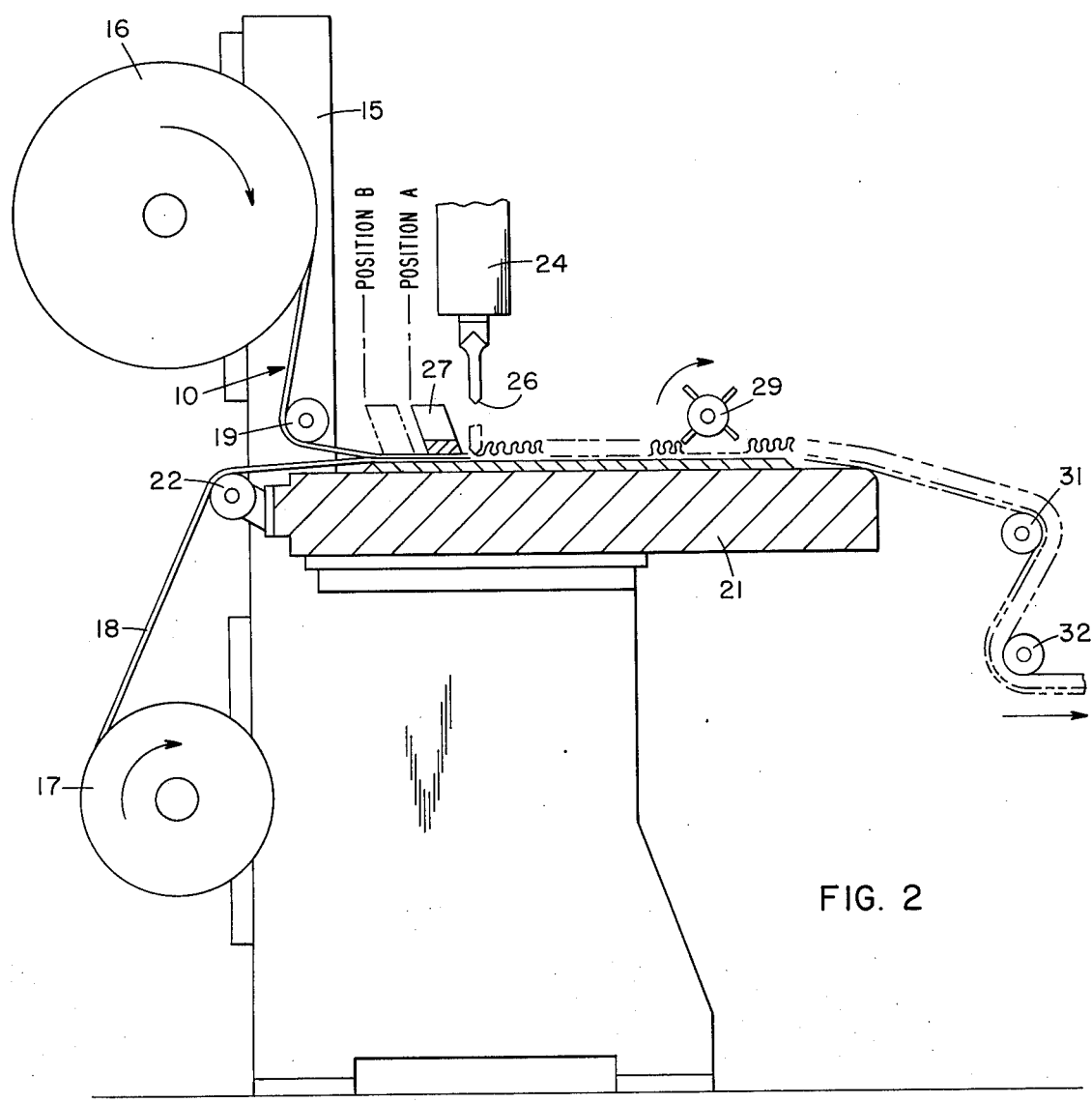
FIG. 2 is a schematic representation of apparatus for making pile fabric in accordance with the principles of this invention, with a portion of the apparatus being cut away for purposes of illustration.

Referring to FIG. 2, there is shown apparatus for producing pile fabric in accordance with the principles of this invention. The apparatus includes a frame 15 to which a supply roll 16 of striated film 10 and a supply roll 17 of thermoplastic backing material 18 are rotatably mounted. The striated film 10 is guided over a guide roll 19 onto an anvil 21. The sheet-like backing material 18 is guided over a guide roll 22 to a position between the striated film 10 and the anvil 21. A sonic device generally designated as 24 and having a sonic horn 26 is mounted above the anvil 21 and is adapted for movement toward and away from the anvil to sonically bond the striated film 10 to the backing sheet 18. A loop-forming apparatus generally designated as 27 is mounted for reciprocating or oscillating movement to form loops or waves in the striated film 10.

Figure 3:
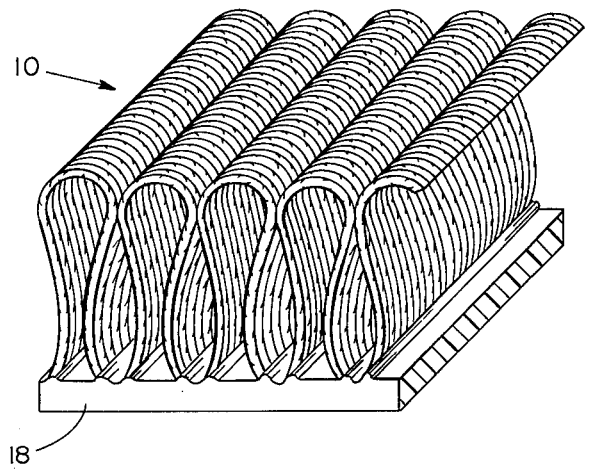
FIG. 3 is an illustration of the product formed by the striated film being sonically fusion bonded to the backing member, but prior to being fibrillated.

To explain the loop-forming operation, when the horn 26 is in its downward position and pressure is exerted on the striated film 10 and backing member 18, the loop-forming bar 27 is retracted from Position A to Position B as shown in FIG. 2. The bar 27 has a width substantially equal to the width of the striated film and its lower surface, which contacts the striated film 10, is either covered with a non-skid material such as rubber or the like, or is serrated. The fusion bond formed by the ultrasonic device 24 retains the striated film 10 and permits the loop-forming bar 27 to slide rearward relative to the striated film 10 to Position B. The loop-forming bar 27 is then urged forward to Position A while exerting a downward force on the striated film 10. As the bar 27 moves forward, the striated film 10 being free to move from the supply roll 16 is pushed ahead of the bar 27 and forms a loop or wave transversely across the film as shown more clearly in FIG. 3. The height of this loop is determined by the distance between Position A and Position B, which may be adjusted as desired.

Simultaneously with the raising of the sonic device 24 and with the reciprocation or oscillation of the loop-forming bar 27, the pile material is indexed or advanced a predetermined distance by rolls 31 and 32. The predetermined distance of indexing or advancement determines the spacing between the transverse rows.

The sonic device 24 is adapted to raise and lower the horn 26 into and out of engagement with the striated film 10 and backing member 18. The actuating means for the sonic device 24 is not shown but may include a double acting pneumatic cylinder which is preferably operated by a cycling mechanism that provides an adjustable dwell of the horn 26 at each end of its stroke and that also energizes a sonic transducer in timed relation to the movement of the horn 26. For example, in operation, the horn 26 may be moved into engagement with the materials and energized for a brief interval to effect a bond, after which there is a brief dwell to allow partial cooling of the bond before the horn is raised out of engagement with the materials.

If desired, however, the device 24 can be continuously energized and the bonding time can be determined by the interval that the horn 26 is maintained in its bonding position relative to the striated film and backing sheet.

The sonically bonded material advances from the sonic bonding position to a fibrillating position wherein a fibrillating roll 29 which may be of the beater bar type shown in U.S. Pat. Nos. 3,494,522 and Re. 27,727, fibrillates the striated film 10 to form individual filaments therefrom. The impact of the blades of the fibrillating roll 29 fractures or breaks the upright loops in the web sections 12 of striated film 10 to form individual filaments. More than one fibrillating roll may be used if desired. Additionally, other fibrillating means may also be utilized, such as air jets or the like.

Figure 4:
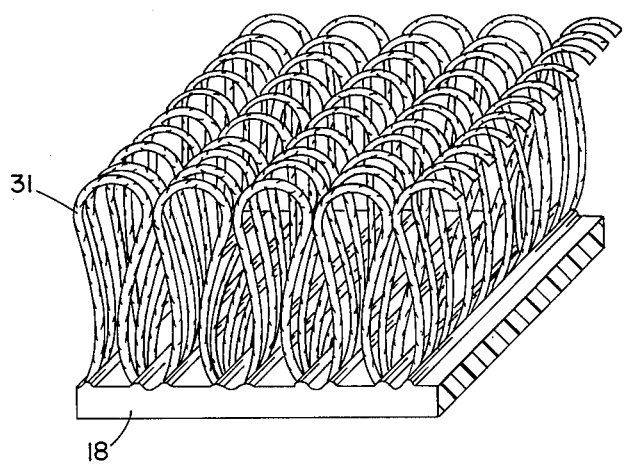
FIG. 4 is an illustration of the pile fabric formed after fibrillation of the product shown in FIG. 3.

The pile fabric produced following fibrillation is shown in FIG. 4, which illustrates the backing sheet 18 having individual pile loops 31 formed in rows therein. If desired, the loop pile fabric may be converted to a cut pile fabric by passing it through a conventional pile shearing machine to cut the tops of the loops off.

The fibrillation operation is basically an operation in which the striated film is caused to be fractured along the webs 12 between ribs or striations 11. The longitudinal webs determine and maintain the direction of splitting. Furthermore, in view of the relative thinness of the webs 12 compared to the thickness of the ribs 11 in the striated film 10, the webs easily split upon fibrillation leaving the ribs intact.

The backing material 18 used herein may take a variety of structural forms, depending upon the particular application intended. Common to all the forms, however, is the necessity that the backing material be of a thermoplastic composition, and preferably, of the same composition as the striated film to insure good fusion bonding. Some typical forms of backing may be cast films, drawn films such as biaxially oriented films, and fiber reinforced films. Materials of a woven structure could also be used and include woven fabrics of monofilament or multifilament yarns and woven materials of slit film. Other applicable backing materials fall in the category of nonwoven fabrics and would include those composed of randomly disposed oriented filamentary elements bonded at their points of intersection and such other nonwoven materials consisting of continuous filaments laid down in a specific pattern, usually multi-layered, and bonded at the filament intersection or by other means. Other possible backing materials include nettings or laminates of any two or more of the above-described forms.

While the invention as described above has referred to bonding one striated film to a thermoplastic backing sheet, many variations are possible. For example, to increase the density of the surface pile, two or more layers of striated film may be fed and bonded simultaneously to the backing member. By varying the properties of these two films, such as color and fiber denier, for example, other variations to the product can be obtained. Another possible variation for increasing the density of the surface pile is to use a backing material or film which has been previously drawn. After sonic bonding the loops at very close intervals, and after fibrillating, the completed pile material may be shrunk by the application of heat to the backing material only, thereby causing the rows of loops to come closer together and thus increase the denseness of the surface pile. Additionally, a backing material that has been oriented in both the longitudinal and the transverse directions could be utilized and after sonic bonding and fibrillating, the backing sheet could be shrunk by the application of heat thereto causing the pile material to shrink in two directions, thus resulting in a further compacting of the surface pile. In operation, the striated film 10 is advanced by the pusher bar or loop-forming bar 27 forming a loop or wave in the material transversely across its width beneath the sonic device 24. When the sonic device 24 is energized, high frequency mechanical vibrations are present at the tip of the ultrasonic horn 26. These vibrations are transmitted to the materials to be bonded by engaging the horn tip with the materials. Heat is generated at the line of contact of the horn 26 with the thermoplastic striated film 10 and backing member 18 to fusion bond them together. This heat is generated only at the bonding line under the horn tip which is under pressure, and heating is so localized that portions of the striated film and backing sheet 18 immediately adjacent the horn tip are not affected. Thus, the orientation of the striated film and the backing member is not adversely affected away from the bonding line. After the bonding cycle is completed, the horn 24 is raised and the loop-forming device 27 retracted. The bonded product is then incrementally advanced by rolls 31 and 32 and loop-forming device 27 reciprocates, pushing another wave or loop of striated film 10 into position beneath the sonic horn 26 to repeat the operation. As the bonded product advances into the fibrillating area, the striated film 10 is fibrillated by fibrillating roll 29 as previously described, to form the pile fabric.

The pile fabrics produced by this process have many advantages, including low cost, no adhesive solvent or weaving operation required to bond the filaments to the backing sheet, a pull-out and run-proof product since each individual fiber is bonded to the backing sheet, no fraying or unraveling of the fibers when the product is cut in either the transverse or longitudinal direction, dimensional stability of the product, and the backing material is not weakened by the pile yarn being forced therethrough. The pile fabrics may be used for many applications such as, for example, floor and wall coverings. Other product areas include, for example, bath mats, automobile mats, and grass-like coverings useful in pool and patio areas. For a grass-like appearance, the striated film can be relatively thick and the grooves spaced relatively far apart so that when split, the ribs would simulate blades of grass. The height of the pile loops can be made relatively high and the top of the loops can be sheared either before or after fibrillation. This provides a product having a grass-like appearance.

The embodiments of the invention described above are exemplary only and many other modifications can be made. For example, instead of a stationary anvil and a movable sonic device, a stationary sonic device and movable anvil can be utilized. Further, instead of the loop-forming bar described, other facilities which grip and advance the striated film to form a loop therein can also be utilized.

The use of the term "thermoplastic" in characterizing the pile fabric components of the present invention is to be understood as including, for example, blended components which may be only partially thermoplastic. For example, the backing member may be in the form of a blend containing both thermoplastic and non-thermoplastic constituents. The only criteria is that both the film and the backing member components contain thermoplastic constituents preferably in a major proportion and having substantially the same melting points, and that the non-thermoplastic constituents are not damaged by the bonding operation. Polypropylene is a particularly suitable thermoplastic material.

It is to be understood that the above described embodiments are merely illustrative of applications of the principles of this invention and that numerous other arrangements and modifications may be made within the spirit and scope of the invention.

What I claim and desire to protect by Letters Patent is:

1. A method of making pile fabric comprising:
   advancing a continuous film of longitudinally striated and oriented thermoplastic material having longitudinal ribs interconnected by webs or reduced thickness;
   advancing a continuous thermoplastic backing member;
   forming upstanding transverse loops in said striated film having a portion thereof in contact with said backing member;
   sonically fusion bonding said contacting portion of said striated film to said backing member; and
   fibrillating said striated film after bonding to break the webs and separate the longitudinal ribs into individual filaments.

2. A method of making pile fabric as set forth in claim 1, including the step of shearing the tops of the individual looped filaments.

3. A method of making pile fabric as set forth in claim 2 wherein said striated film is fibrillated by engaging one or more rotating beater bars.

4. A method of making pile fabric as set forth in claim 1 wherein two or more layers of striated film are simultaneously advanced, bonded to said backing member and fibrillated.

5. Apparatus for making pile fabric comprising:
   means for advancing a continuous striated film having longitudinal ribs interconnected by webs of reduced thickness;
   means for advancing a continuous thermoplastic backing member;
   means for forming upstanding transverse loops in said film with the bottoms of said loops in contact with said backing member;
   means for sonically fusion bonding said striated film to said backing member; and
   means for fibrillating said bonded film to break said webs and separate said ribs into individual filaments.

6. Apparatus for making pile fabric as set forth in claim 5 wherein said fibrillating means comprises a rotating bar having serrated edges.

7. Apparatus as set forth in claim 5 wherein said fusion bonding means includes horn and an anvil movable relatively toward each other to define a bond line therebetween.

8. Apparatus as set forth in claim 7 wherein said forming means includes a movable loop-forming bar mounted for movement toward and away from said bond line so that said bar slides relative to said striated film when moved away from said bond line and engages and advances said striated film to form a loop therein having a portion thereof in engagement with said bond line when moved toward said bond line.

* * * * *